US008879404B2

(12) United States Patent
Jones et al.

(10) Patent No.: US 8,879,404 B2
(45) Date of Patent: Nov. 4, 2014

(54) APPARATUS FOR MANAGING COMMUNICATION DEVICE IDENTIFIERS

(75) Inventors: Gregory Jones, Dallas, TX (US); Corey Jones, Ennis, TX (US)

(73) Assignee: AT&T Intellectual Property I, LP, Atlanta, GA (US)

(*) Notice: Subject to any disclaimer, the term of this patent is extended or adjusted under 35 U.S.C. 154(b) by 1901 days.

(21) Appl. No.: 11/971,520

(22) Filed: Jan. 9, 2008

(65) Prior Publication Data

US 2009/0176480 A1   Jul. 9, 2009

(51) Int. Cl.
*H04L 12/26* (2006.01)
*H04W 4/00* (2009.01)

(52) U.S. Cl.
USPC .......................................... 370/252; 370/338

(58) Field of Classification Search
None
See application file for complete search history.

(56) References Cited

U.S. PATENT DOCUMENTS

| | | | | |
|---|---|---|---|---|
| 6,842,814 B1* | 1/2005 | Kim et al. | ...................... | 710/305 |
| 7,027,836 B2* | 4/2006 | Zacks et al. | .................... | 455/557 |
| 7,047,030 B2* | 5/2006 | Forsyth | ......................... | 455/518 |
| 7,392,048 B2* | 6/2008 | Seligmann et al. | ........ | 455/426.1 |
| 7,502,335 B2* | 3/2009 | Lin | ............................... | 370/278 |
| 7,730,216 B1* | 6/2010 | Issa et al. | ...................... | 709/250 |
| 8,150,416 B2* | 4/2012 | Ribaudo et al. | ............ | 455/456.1 |
| 2004/0203363 A1* | 10/2004 | Carlton et al. | ............... | 455/41.2 |
| 2005/0231425 A1* | 10/2005 | Coleman et al. | ............. | 342/385 |
| 2006/0083208 A1* | 4/2006 | Lin | ................................ | 370/338 |
| 2006/0168344 A1 | 7/2006 | Tsuchiya | | |
| 2006/0194596 A1* | 8/2006 | Deng | ............................ | 455/466 |
| 2007/0072597 A1* | 3/2007 | Peuziat et al. | ................ | 455/418 |
| 2007/0280136 A1* | 12/2007 | Chen et al. | ..................... | 370/254 |
| 2007/0283157 A1* | 12/2007 | Yami et al. | .................... | 713/175 |
| 2007/0299852 A1* | 12/2007 | Miyata | ............................ | 707/10 |
| 2009/0157496 A1* | 6/2009 | Davis et al. | ..................... | 705/14 |

FOREIGN PATENT DOCUMENTS

| | | | |
|---|---|---|---|
| KR | 100400832 B | | 9/2003 |
| TW | 271960 B | | 1/2007 |

* cited by examiner

*Primary Examiner* — Steven H Nguyen
(74) *Attorney, Agent, or Firm* — Guntin & Gust, PLC; Joseph P. Hrutka (57) ABSTRACT

An apparatus for managing communication device identification is disclosed. A system that incorporates teachings of the present disclosure may include, for example, a multimode communication device having a controller to wirelessly transmit a device identifier of the multimode communication device to another multimode communication device, where the device identifier is transmitted using a short distance mode of communication, where the device identifier is transmitted without retrieving data from an address book of the multimode communication device, and where the device identifier is transmitted in response to actuation of at least one of a dedicated button or a code on a keypad of the multimode communication device. Other embodiments are disclosed.

20 Claims, 6 Drawing Sheets

APPARATUS FOR MANAGING COMMUNICATION DEVICE IDENTIFIERS

FIELD OF THE DISCLOSURE

The present disclosure relates generally to communication systems and more specifically to an apparatus for managing communication device identifiers.

BACKGROUND

Providing communication device identification information or identifiers, such as a telephone number, to another individual can be a tedious effort that is prone to error. The recipient of the information often attempts to insert both the telephone number and the name corresponding to the communication device into an address book stored on his or her communication device, which can require accurate data entry of a number of characters. Individuals entering erroneous device identifier data can be exacerbated when the information exchange is being done in a hurry, such as when individuals need to meet somewhere at an impending time.

Individuals often desire that their communication device identification information, or such information in their possession for other individuals, be provided to only selected recipients. Address book sharing amongst communication devices can allow for proliferation of the identification information to various individuals without any knowledge by the owners of the communication devices associated with the identification information.

DETAILED DESCRIPTION

In one embodiment of the present disclosure, a computer-readable storage medium comprises computer instructions for wirelessly receiving a device identifier on a second mobile communication device from a first mobile communication device, wherein the device identifier is transmitted using a short distance signal and is associated with the first mobile communication device and wherein the short distance signal is one mode of a plurality of modes of communication of the first and second mobile communication devices, storing the device identifier on the second mobile communication device, and limiting sharing of the device identifier by the second mobile communication device with other mobile communication devices.

In another embodiment of the present disclosure, a multimode communication device comprises a controller to wirelessly transmit a device identifier of the multimode communication device to another multimode communication device, wherein the device identifier is transmitted using a short distance mode of communication, wherein the device identifier is transmitted without retrieving data from an address book of the multimode communication device, and wherein the device identifier is transmitted in response to actuation of at least one of a dedicated button or a code on a keypad of the multimode communication device.

In yet another embodiment of the present disclosure, a multimode communication device comprises a controller to wirelessly receive a device identifier of another multimode communication device, wherein the device identifier is transmitted using a short distance mode of communication, wherein the device identifier is transmitted without retrieving data from an address book of the multimode communication device, and wherein sharing of the device identifier with other multimode communication devices is limited.

Figure 1:
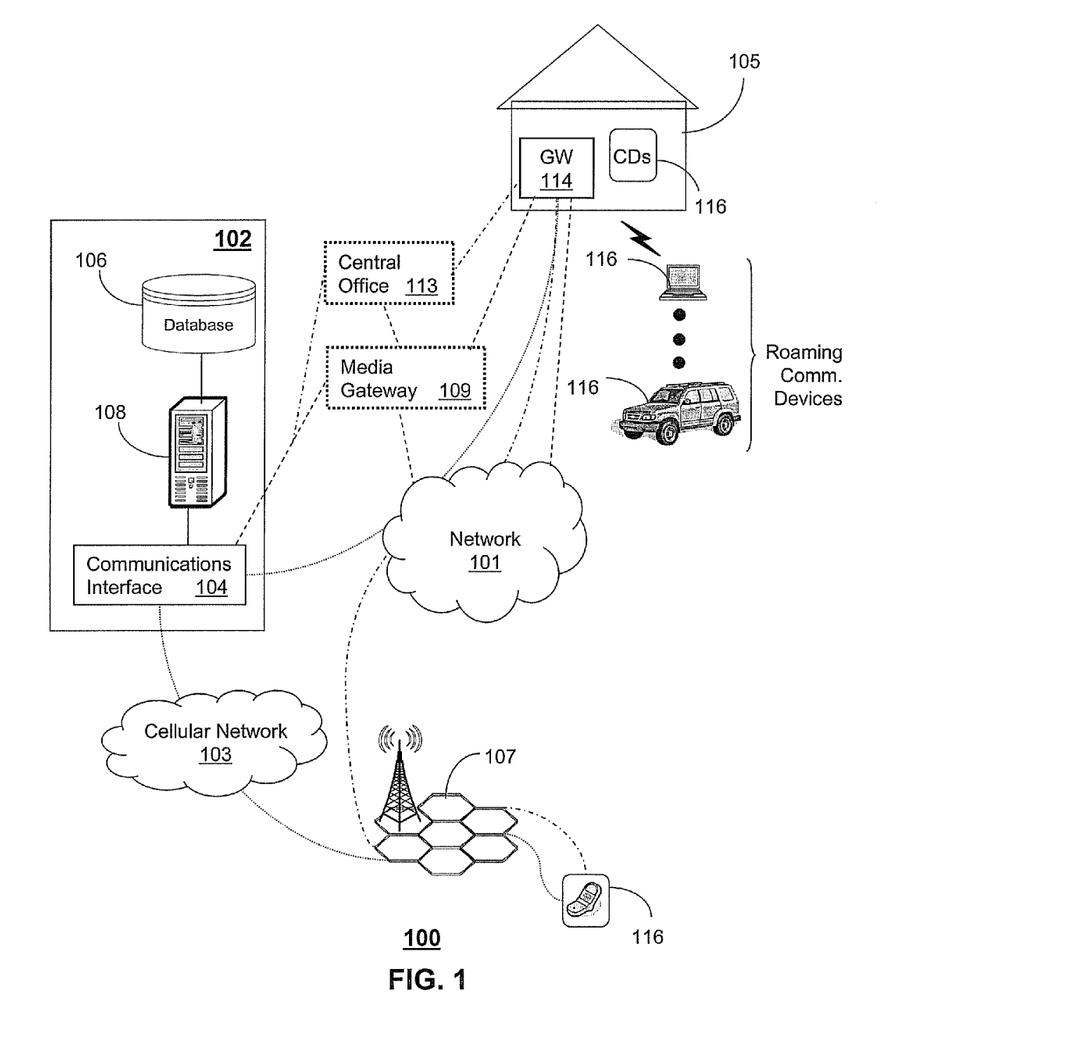
FIGS. 1-3 depict exemplary embodiments of communication systems that provide media services.

FIG. 1 depicts an exemplary block diagram of a communication system 100 that can supply media services to one or more fixed and/or roaming communication devices 116. The communication devices 116 can communicate by way of wired and/or wireless access points (WAPs) with other communication devices and/or a network proxy or network management system 102 which collectively operate in the communication system 100. The communication device 116 can be a mobile or wireless device. In one embodiment, the communication device 116 can be a multimode VoIP terminal. However, the present disclosure contemplates the use of other types of communication devices, including other types of voice, video and data devices. The communication system 100 can comprise a packet-switched network 101. The packet-switched network can be an Internet Service Provider (ISP) network 101. The network 101 can be coupled to the network proxy 102, a cellular network 103 and network elements, including network elements located in a building 105 representing an enterprise or residence. The ISP network 101 can utilize computing technology for transporting Internet traffic.

In an enterprise setting, the building 105 can include a gateway 114 that provides voice, video and/or data connectivity services between communication devices 116, such as VoIP terminals or other forms of communication devices of enterprise personnel. In a residential setting, the building 105 can include a gateway 114 represented by, for example, a residential gateway coupled to a central office 113 utilizing conventional telephonic switching for processing calls with third parties.

The network proxy 102 can be used to control operations of a media gateway 109, the central office 113 and/or the gateway 114. Communications between the network proxy 102, the communication devices 116 and/or other network elements of the communication system 100 can conform to any number of signaling protocols such as a session initiation protocol (SIP), or a video communications protocol such as H.323 which combines video and voice over a packet-switched network.

The network proxy 102 can comprise a communications interface 104 that utilizes common technology for communicating with the network 101, the media gateway 109, the cellular network 103, and/or the gateway 114, such as over an IP interface. By way of the communications interface 104, the network proxy 102 can direct by common means any of the foregoing network elements to establish packet switched data, voice, and/or video connections between communication devices 116 distributed throughout the communication system 100. The network proxy 102 can further comprise a memory 106 (such as a high capacity storage medium) embodied in this illustration as a database, and a controller 108 that can make use of computing technology such as a desktop computer, or scalable server for controlling operations of the network proxy 102. The network proxy 102 can operate as an IP Multimedia Subsystem (IMS) conforming in part to protocols defined by standards bodies such as 3GPP (Third Generation Partnership Protocol).

Under the control of the network proxy 102, the media gateway 109 can link packet-switched and circuit-switched technologies such as the cellular network 103 (or central office 113) and the network 101, such as an ISP network. The media gateway 109 can conform to a media gateway control protocol (MGCP) also known as H.248 defined by work groups in the Internet Engineering Task Force (IETF). This protocol can handle signaling and session management needed during a multimedia conference. The protocol defines a means of communication which converts data from the format required for a circuit-switched network to that required for a packet-switched network. MGCP can therefore be used to set up, maintain, and terminate calls between multiple disparate network elements of the communication system 100. The media gateway 109 can therefore support hybrid communication environments for communication devices 116, including VoIP terminals.

The central office 113 can house common network switching equipment for distributing local and long-distance telecommunication services supplied by network 101 to building 105. Telecommunication services of the central office 113 can include traditional POTS (Plain Old Telephone Service) and broadband services such as HDTV, DSL, VoIP (Voice over Internet Protocol), IPTV (Internet Protocol Television), Internet services, and so on. The communication system 100 can utilize common computing and communications technologies to support circuit-switched and/or packet-switched communications, including MPLS (MultiProtocol Label Switching).

The cellular network 103 can support voice and data services over a number of access technologies such as GSM-GPRS, EDGE, CDMA-1X, UMTS, WiMAX, software defined radio (SDR), and other known and future technologies. The cellular network 103 can be coupled to base stations 107 under a frequency-reuse plan for communicating over-the-air with roaming communication devices 116, such as VoIP terminals.

Figure 2:
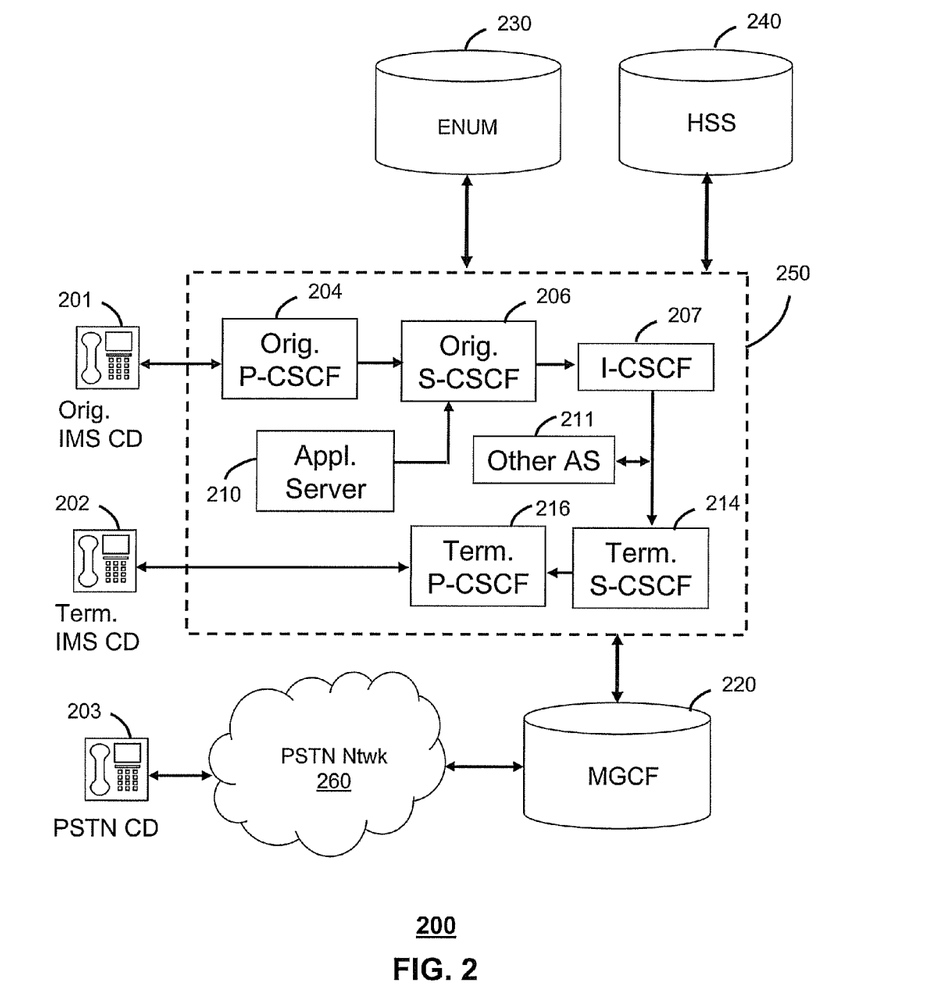

FIG. 2 depicts an exemplary embodiment of a second communication system 200 employing a IP Multimedia Subsystem (IMS) network architecture. Communication system 200 can be overlaid or operably coupled with communication system 100 as another representative embodiment of the communication system.

The communication system 200 can comprise a Home Subscriber Server (HSS) 240, a tElephone NUmber Mapping (ENUM) server 230, and network elements of an IMS network 250. The IMS network 250 can be coupled to IMS compliant communication devices (CD) 201, 202 or a Public Switched Telephone Network (PSTN) CD 203 using a Media Gateway Control Function (MGCF) 220 that connects the call through a common PSTN network 260.

IMS CDs 201, 202 register with the IMS network 250 by contacting a Proxy Call Session Control Function (P-CSCF) which communicates with a corresponding Serving CSCF (S-CSCF) to register the CDs with an Authentication, Authorization and Accounting (AAA) support by the HSS 240. To accomplish a communication session between CDs, an originating IMS CD 201 can submit a SIP INVITE message to an originating P-CSCF 204 which communicates with a corresponding originating S-CSCF 206. The originating S-CSCF 206 can submit the SIP INVITE message to an application server (AS) such as reference 210 that can provide a variety of services to IMS subscribers. For example, the application server 210 can be used to perform originating treatment functions on the calling party number received by the originating S-CSCF 206 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 206 can submit queries to the ENUM system 230 to translate an E.164 telephone number to a SIP Uniform Resource Identifier (URI) if the targeted communication device is IMS compliant. If the targeted communication device is a PSTN device, the ENUM system 230 will respond with an unsuccessful address resolution and the S-CSCF 206 will forward the call to the MGCF 220 via a Breakout Gateway Control Function (not shown).

When the ENUM server 230 returns a SIP URI, the SIP URI is used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214 which can call on an application server 211 similar to reference 210 to perform the originating treatment telephony functions described earlier. The terminating S-CSCF 214 can then identify a terminating P-CSCF 216 associated with the terminating CD 202. The P-CSCF 216 then signals the CD 202 to establish communications. The aforementioned process can be symmetrical. Accordingly, the terms "originating" and "terminating" in FIG. 2 can be interchanged.

Figure 3:
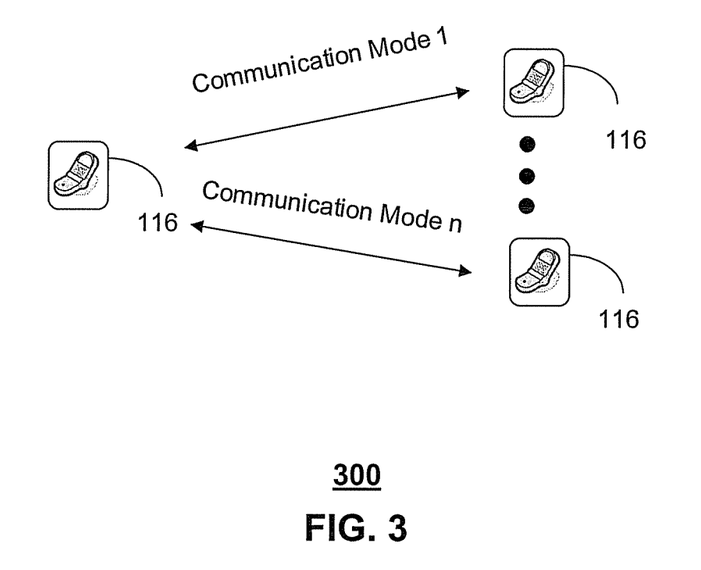

FIG. 3 depicts an exemplary embodiment of a third communication system 300 employing a multi-mode communication capability. Communication system 300 can be overlaid or operably coupled with communication systems 100 and 200 as another representative embodiment of the communication systems. In one embodiment, one or more of the communication devices 116 can be a multimode device that has a first mode of communication for wirelessly communicating over longer distances (e.g., cellular communication) and a second mode of communication for wirelessly communicating over shorter distances (e.g., 802.11 communication).

In one embodiment, the second mode of communication of the communication device 116 can be a low power RF signal (e.g., limited to a radius of five feet). In another embodiment, the strength of the signal and the distance of transmission can be adjusted, such as by the communication device 116 based on a determination of the distance from the receiving communication device.

Any number of modes of communication can be utilized by the multimode communication device 116. In one embodiment, the communication device 116 can have various components that allow for the detection of a mode of communication being utilized by another device (e.g., a mobile phone with Wireless Fidelity (WiFi) communication ability). One or more of the same components can be utilized for communicating using the different modes of communication, and/or multiple components having the same or similar function (e.g., multiple transceivers) can also be utilized by the communication device 116.

Figure 4:
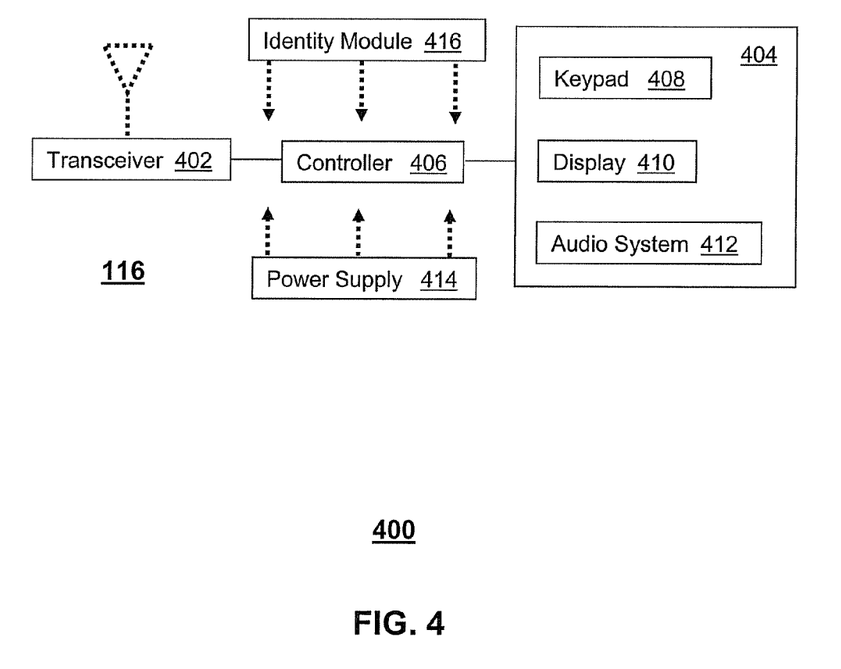
FIG. 4 depicts an exemplary block diagram of one of several embodiments for a communication device operating in the communication system.

FIG. 4 depicts an exemplary embodiment of a communication device 116 that is mobile or wireless. The wireless communication device 116 can comprise a wireless transceiver 402, a user interface (UI) 404, a power supply 414, and a controller 406 for managing operations thereof. The transceiver 402 can utilize common technologies to support singly or in combination any number of wireless access technologies including without limitation cordless phone technology (e.g., DECT), Bluetooth™, WiFi, Worldwide Interoperability for Microwave Access (WiMAX), Ultra Wide Band (UWB), software defined radio (SDR), and cellular access technologies such as CDMA-1X, W-CDMA/HSDPA, UMTS, GSM/GPRS, TDMA/EDGE, and EVDO. SDR can be utilized for accessing a public or private communication spectrum according to any number of communication protocols that can be dynamically downloaded over-the-air to the communication device 116. It should be noted also that next generation wireless access technologies can be applied to the present disclosure. The present disclosure also contemplates the use of two or more transceivers 402 to accommodate two or more modes of communication.

The UI 404 can include a keypad 408 with depressible or touch sensitive navigation disk and/or keys for manipulating operations of the communication device 116. Keypad 408 can include a designated key for transmitting a communication device identifier (e.g., a telephone number, an email address, an instant messaging address, and so forth) to another communication device. In one embodiment, the designated key of the keypad 408 can transmit the communication identifier of the communication device 116 based on data stored in a memory of the device without accessing an address book file of the communication device. The UI 404 can further include a display 410 such as monochrome or color LCD (Liquid Crystal Display) for conveying images to the end user of the communication device 116, and an audio system 412 that utilizes common audio technology for conveying and intercepting audible signals of the end user.

The power supply 414 can utilize common power management technologies such as replaceable batteries, supply regulation technologies, and charging system technologies for supplying energy to the components of the communication device 116 and to facilitate portable applications. In stationary applications, the power supply 414 can be modified so as to extract energy from a common wall outlet and thereby supply DC power to the components of the communication device 116. The controller 406 can utilize computing technologies such as a microprocessor and/or digital signal processor (DSP) with associated storage memory such a Flash, ROM, RAM, SRAM, DRAM or other like technologies for controlling operations of the aforementioned components of the communication device 116. The memory of the controller 406 can have operational data stored therein, as well as personalized data including contact book entries, calendar entries, still pictures, ring tones, wallpapers, music, video recordings, movies and games.

The communication device 116 can also comprise an identity module 416. In one embodiment, the identity module 416 can be removably connectable to the communication device 116 to provide for selective coupling with the controller 406 of the communication device. The identity module 416 can have a memory for storage of various data including an international circuit card identification (ICCID), international mobile subscriber identity (IMSI), authentication information, a local area identity (LAI), a short message service center (SMSC) number, service provider name (SPN), service dialing numbers (SDN), and value added service (VAS) applications. The data can also be personalized data including contact book entries, calendar entries, still pictures (e.g., JPEG or GIF files), ring tones (e.g., MIDI files), wallpapers, audio (e.g., MP3 files), video recordings (e.g., captured by a camera coupled with the communication device 116), movies (e.g., MP4 or WAV files), and games.

In one embodiment, the identity module 416 can be a subscriber identity module (SIM) card, a universal subscriber identity module (USIM) card or a removable user identification module (RUIM) card. In another embodiment, the identity module 416 can be a Willcom-SIM (W-SIM) card having one or more core components of the communication device 116 therein, such as a W-SIM card for a cellular telephone with the radio receiver and transmitter built into the card.

Figure 5:
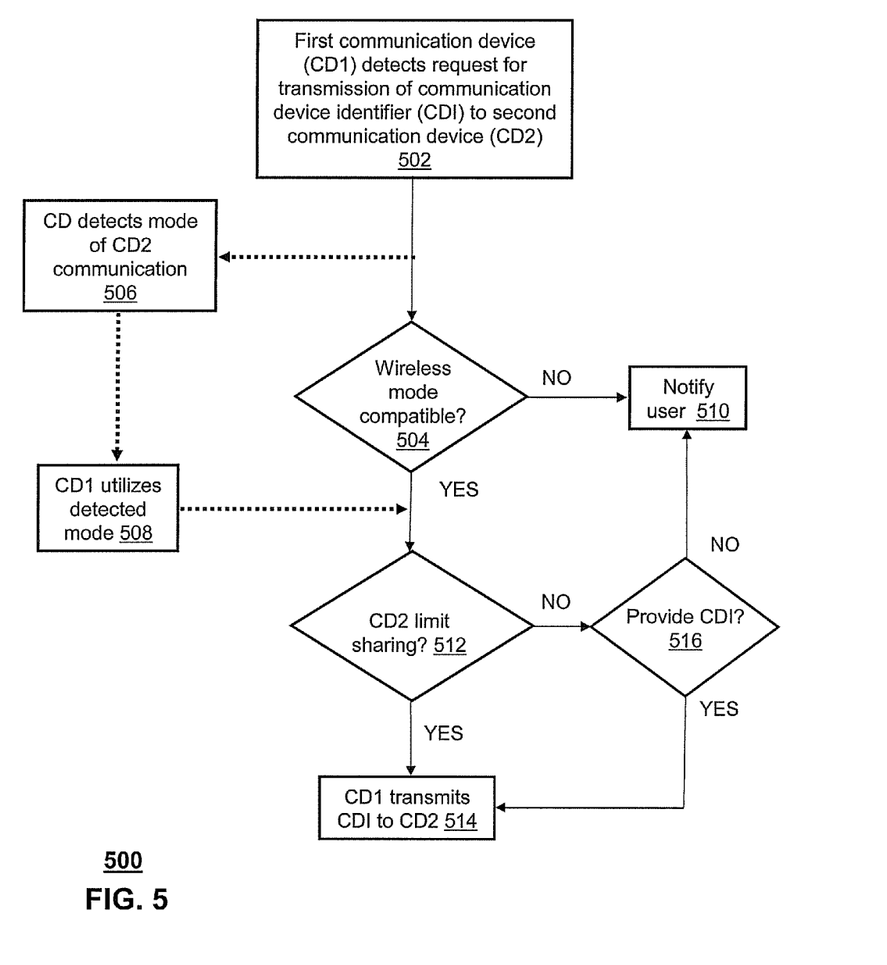
FIG. 5 depicts an exemplary method operating in portions of the communication systems of FIGS. 1-3.

FIG. 5 depicts an exemplary method 500 operating in portions of one or more of the communication systems 100-300. Method 500 has variants as depicted by the dashed lines. It would be apparent to an artisan with ordinary skill in the art that other embodiments not depicted in FIG. 5 are possible without departing from the scope of the claims described below. For convenience, reference to one or more features of communication system 300 as used in the following paragraphs can mean one or more features of the communication systems 100, 200, and 300 singly or in combination, including communication devices 116, 201, 202, and/or 203.

Method 500 begins with step 502 where the communication device 116 can receive, detect or otherwise obtain a request for transmission of the communication device identifier information, such as a telephone number, email address, instant message address or other data that facilitates communication, to a second communication device. In one embodiment, the transmitting and receiving communication devices 116 can have wireless communication capability.

The request can be generated by the user of the transmitting communication device 116, such as through depressing a dedicated key or pressing a particular code into the keypad. In one embodiment, the request can be voice activated. In another embodiment, the request for the communication device identifier can be received from the second or receiving communication device 116. The request signal can be used to determine which mode of communication is to be utilized in transmitting the communication device identifier.

In one embodiment, the detection of the request for the communication device identifier can occur while the communication device 116 is being utilized for communication, such as with a third communication device. For example, a wireless multimode communication device 116 can be communicating with the third communication device using its first mode of communication (e.g., cellular communication), while its second mode of communication (e.g., WiFi) is used to transmit the communication device identifier to the second communication device. Where the request for the communication device identifier is received from the second communication device, a request icon or other indicia can be presented on the first communication device 116 upon receipt of the request. This can allow the user to accept or reject sharing of the device identifier with the other communication device 116. In another embodiment, any mode of communication of the communication device 116, including the first mode of communication as described above, can be utilized to transmit the communication device identifier to the second communication device, such as where the second communication device is a single mode device.

In step 504, the communication device 116 can determine if the wireless mode of communication of the second communication device is compatible with its available modes of communication. For example, a multimode cellular communication device 116 can have a second mode of communication using 802.11 protocol or other modes of communication, and can determine if this mode is compatible with the mode of communication utilized by the second communication device.

In one embodiment, the first communication device 116 can detect the mode of wireless communication capability of the second communication device as in step 506 and can select that mode from a plurality of modes of communication available to the multimode first communication device as in step 508. For example, a multimode cellular communication device 116 can have the capability of communicating with a second communication over one of its many modes of communication through selection of the compatible communication mode, such as cordless phone technology (e.g., DECT), Bluetooth™, WiFi, WiMAX, UWB, SDR, and RF. As another example, a first multimode communication device 116 can transmit the communication device identifier to a second communication device using a short range mode of communication (e.g., RF), and can transmit the identifier to a third communication device over a long range mode of communication (e.g., cellular) where the third communication device does not have multimode capability.

If the first communication device 116 and the second communication device are unable to communicate over a desired short range mode of communication then in step 510 the user of the first and/or second communication devices can be notified of the incompatibility. In one embodiment, a compatibility icon or other indicia can be presented on one or both of the communication devices 116 to indicate compatibility of the short range modes. In another embodiment, if the first and second communication devices 116 do not have a short range mode compatibility then they can use their long range communication mode (e.g., cellular).

If on the other hand, the first communication device 116 and the second communication device can communicate wirelessly over a desired short range mode of communication, then in step 512 the first communication device can determine whether the second communication device will limit sharing of the communication device identifier with others. Limiting sharing of the communication device identifier can be done based on a number of techniques. For example, the second communication device 116 can store the communication device identifier where the actual identifier information is not presented to the second user but only the name or other identification of the first user is presented. In another embodiment, the device identifier data can be stored by the second communication device for only a limited amount of time so that it is deleted or otherwise removed from the device thereafter.

The present disclosure also contemplates the use of other structure and methodologies for limiting sharing of the communication device identifier with third parties, including copy protection techniques. In one embodiment, the device identifier data from the first communication device can be encrypted based on information associated with the second communication device (e.g., an encryption key) so that other communication devices cannot decrypt the identifier data. In this exemplary embodiment, the identifier can remain hidden in an address book or the like of the second communication device while an identity of the user is presented in the address book.

In step 514, if the second communication device 116 will limit sharing of the communication device identifier, then the first communication device can transmit the device identifier data. If on the other hand, the second communication device 116 will not limit sharing of the communication device identifier then in step 516 the first communication device 116 can present a selection to the user to determine whether he or she still wants to provide the device identifier. If the user decides that the device identifier is not to be presented, such as by entering this selection on the first communication device 116, then method 500 can return to step 510 by providing an acknowledgement that the device identifier will not be transmitted to the second communication device. If on the other hand, the user decides that the identifier is still to be provided to the second communication device, such as by entering this selection on the first communication device 116, then the first communication device can transmit the device identifier data to the second communication device, as in step 514.

Upon reviewing the aforementioned embodiments, it would be evident to an artisan with ordinary skill in the art that said embodiments can be modified, reduced, or enhanced without departing from the scope and spirit of the claims described below. For example, the first communication device 116 can provide the communication device identifier to any number of other communication devices, either simultaneously or otherwise. In one embodiment, the first communication device 116 can provide the identifier to a plurality of other communication devices using a single mode of communication or using a number of different modes of communication.

As another example, the exchange of communication device identifier information can be mutual between the first, second or any number of communication devices 116. For instance, a first communication device 116 can limit transmission of its device identifier to only the other communication devices that exchange their device identifiers. This can be done in a number of different ways, including delaying transmission until receipt of the device identifier from the other communication device.

In one embodiment, a first communication device 116 can transmit the device identifier to the second communication device where the second communication device can accept or reject the identifier, such as by making a selection in response to text appearing on the display or an audio message from the audio system 412 of the second communication device. In another embodiment, the receiving communication device 116 can store the identifier in an address book or the like.

Other suitable modifications can be applied to the present disclosure without departing from the scope of the claims below. Accordingly, the reader is directed to the claims section for a fuller understanding of the breadth and scope of the present disclosure.

Figure 6:
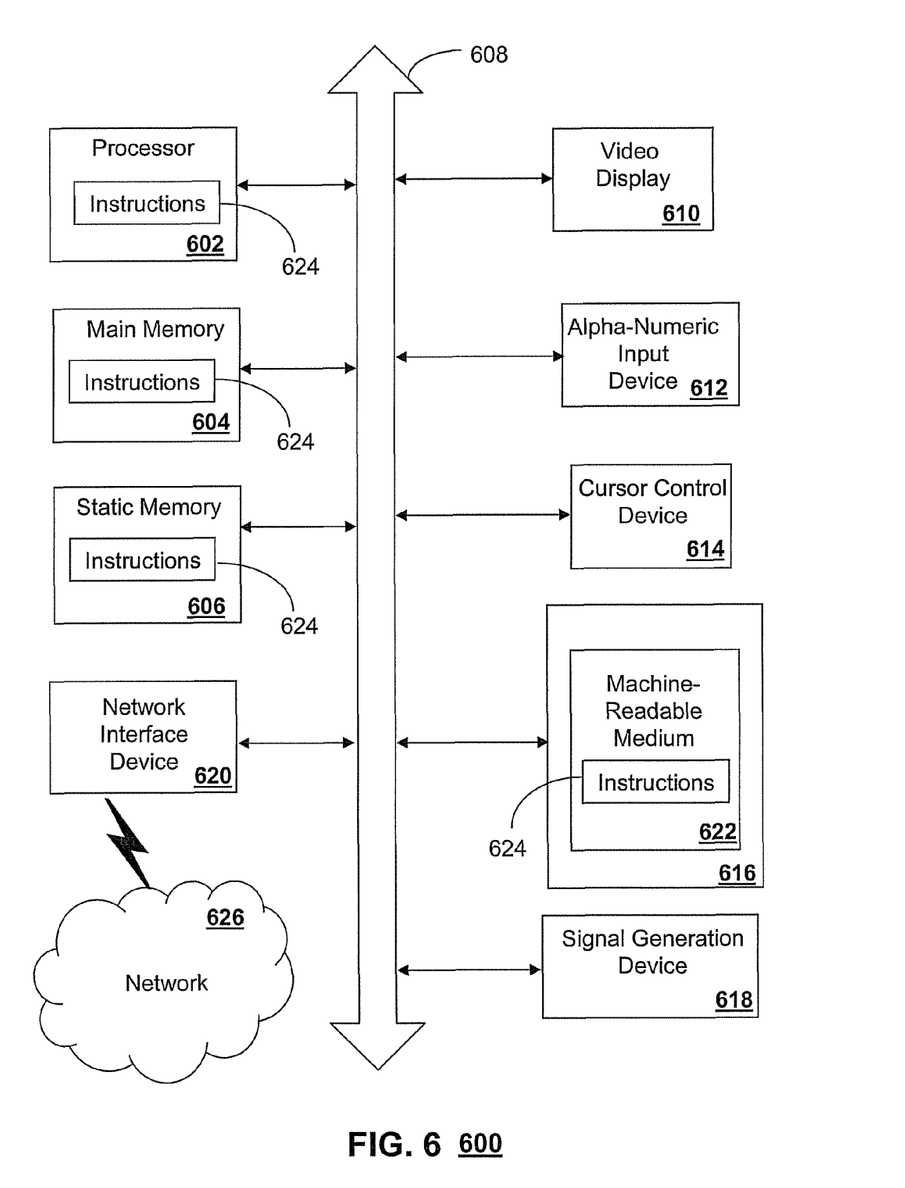
FIG. 6 is a diagrammatic representation of a machine in the form of a computer system within which a set of instructions, when executed, may cause the machine to perform any one or more of the methodologies discussed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions, which when executed by a processor cause the processor to perform operations comprising:

wirelessly receiving a device identifier at a second mobile communication device from a first mobile communication device, wherein the device identifier is transmitted using a short range signal and is associated with the first mobile communication device, wherein the short range signal is one mode of a plurality of modes of communication of the first and second mobile communication devices, and wherein the device identifier comprises a first identifier for enabling the second mobile communication device to communicate with the first mobile communication device in one of the plurality of modes of communication and a second identifier to identify a first user of the first mobile communication device; and storing the device identifier in an address book of the second mobile communication device, wherein the first identifier is concealed in the address book to limit sharing of the device identifier by the second mobile communication device with other mobile communication devices to prevent a presentation of the first identifier.

2. The non-transitory storage medium of claim 1, wherein the first identifier comprises one of a telephone number, an email address or an instant messaging address.

3. The non-transitory storage medium of claim 1, wherein the device identifier is transmitted without retrieving data from the address book of the first mobile communication device.

4. The non-transitory storage medium of claim 1, wherein the second identifier comprises a name of the first user.

5. The non-transitory storage medium of claim 1, wherein the operations further comprise decrypting the device identifier based at least in part on an encryption key associated with the second mobile communication device to limit the sharing of the device identifier.

6. The non-transitory storage medium of claim 1, wherein the operations further comprise deleting the device identifier from the second mobile communication after a pre-determined amount of time to limit the sharing of the device identifier.

7. A method, comprising:

wirelessly receiving a device identifier at a second mobile communication device from a first mobile communication device, wherein the device identifier is transmitted using a short range signal and is associated with the first mobile communication device, wherein the short range signal is one mode of a plurality of modes of communication of the first and second mobile communication devices, and wherein the device identifier comprises a first identifier for enabling the second mobile communication device to communicate with the first mobile communication device in one of the plurality of modes of communication and a second identifier to identify a first user of the first mobile communication device; and storing the device identifier in an address book of the second mobile communication device, wherein the first identifier is concealed in the address book to limit sharing of the device identifier by the second mobile communication device with other mobile communication devices to prevent a presentation of the first identifier.

8. The method of claim 7, wherein the first identifier comprises one of a telephone number, an email address or an instant messaging address.

9. The method of claim 7, wherein the device identifier is transmitted without retrieving data from the address book of the first mobile communication device.

10. The method of claim 7, wherein the second identifier corresponds to a name of the first user.

11. The method of claim 7, further comprising decrypting the device identifier based at least in part on an encryption key associated with the second mobile communication device to limit the sharing of the device identifier.

12. The method of claim 8, further comprising deleting the device identifier from the second mobile communication after a pre-determined amount of time to limit the sharing of the device identifier.

13. The method of claim 8, further comprising limit sharing of the device identifier by encrypting the device identifier with an encryption key.

14. The method of claim 7, further comprising limit sharing of the device identifier by deleting the device identifier after a pre-determined time period.

15. A first multimode communication device, comprising:
a memory to store instructions; and
a controller coupled to the memory, wherein responsive to executing the instructions the controller performs operations comprising:
wirelessly receiving a device identifier of a second multimode communication device responsive to the second multimode communication device determining that the first multimode communication device will limit sharing of the device identifier, wherein the device identifier comprises a first identifier for enabling the first multimode communication device to communicate with the second multimode communication device in one of a plurality of modes of communication of the first and second multimode communication devices, and a second identifier to identify a second user of the second multimode communication device; and storing the device identifier in an address book of the first multimode communication device, wherein the first identifier is concealed in the address book to prevent a presentation of the first identifier.

16. The first multimode communication device of claim 15, wherein the operations further comprise limit sharing of the device identifier by encrypting the device identifier with an encryption key associated with the first multimode communication device.

17. The first multimode communication device of claim 15, wherein the operations further comprise limit sharing of the device identifier by deleting the device identifier after a pre-determined time period.

18. The first multimode communication device of claim 15, wherein the operations further comprise presenting a notification of a receipt of the device identifier at one of a display device or an audio system of the first multimode communication device.

19. The first multimode communication device of claim 15, wherein the operations further comprise:
storing the first identifier and the second identifier of the device identifier in the address book of the first multimode communication device; and
preventing a presentation of the first identifier stored in the address book, while enabling a presentation of the second identifier stored in the address book.

20. The first multimode communication device of claim 15, wherein the operations further comprise transmitting to the second multimode communication device a request for the device identifier of the second multimode communication device responsive to input received from a user interface of the first multimode communication device.

* * * * *